United States Patent
Duan

(10) Patent No.: US 9,045,306 B2
(45) Date of Patent: Jun. 2, 2015

(54) SHEET STABILIZER WITH SUCTION NOZZLE HAVING CENTER PROTRUSION

(75) Inventor: Shizhong Duan, Vancouver (CA)

(73) Assignee: ABB Ltd., Dublin (IE)

( * ) Notice: Subject to any disclaimer, the term of this patent is extended or adjusted under 35 U.S.C. 154(b) by 356 days.

(21) Appl. No.: 12/275,303

(22) Filed: Nov. 21, 2008

(65) Prior Publication Data

US 2009/0134565 A1  May 28, 2009

Related U.S. Application Data

(60) Provisional application No. 60/990,478, filed on Nov. 27, 2007.

(51) Int. Cl.
*B65H 23/24* (2006.01)
*G01B 21/08* (2006.01)

(52) U.S. Cl.
CPC .......... *B65H 23/24* (2013.01); *B65H 2406/112* (2013.01); *G01B 21/08* (2013.01); *G01B 2210/62* (2013.01); *B65H 2406/113* (2013.01); *B65H 2406/122* (2013.01); *B65H 2406/351* (2013.01); *B65H 2511/13* (2013.01); *B65H 2553/00* (2013.01); *B65H 2601/20* (2013.01); *B65H 2801/84* (2013.01)

(58) Field of Classification Search
CPC ............. B65H 23/24; B65H 2406/112; B65H 2406/113; B65H 2406/122; G01B 11/0691; G01B 7/06; G01B 7/063; G01B 7/066; G01B 7/087; G01B 7/107; G01B 21/08; G01B 2210/62
USPC .................... 242/548.4, 566, 615.11, 615.12; 226/97.1, 97.2, 97.3, 196.1; 73/37.5, 73/37.6, 37.7; 324/754.15, 754.16

See application file for complete search history.

(56) References Cited

U.S. PATENT DOCUMENTS

| | | | | |
|---|---|---|---|---|
| 1,946,924 A | * | 2/1934 | Allen et al. | 33/501.03 |
| 3,127,764 A | * | 4/1964 | Hudson | 73/37.5 |
| 3,321,838 A | * | 5/1967 | Albertson, Jr. | 73/37.5 |
| 3,545,256 A | * | 12/1970 | Beeken | 73/37.5 |
| 4,391,127 A | * | 7/1983 | Hawkins | 73/37.7 |

(Continued)

FOREIGN PATENT DOCUMENTS

| CA | 2012667 | 9/1990 |
|---|---|---|
| CA | 2635864 | 7/2007 |

(Continued)

OTHER PUBLICATIONS

Piekarski, Adam, the European Patent Office, European Search Report for corresponding International Application No. PCT/CA2008002082 issued on Dec. 12, 2011.

(Continued)

*Primary Examiner* — William E Dondero
(74) *Attorney, Agent, or Firm* — Michael C. Prewitt; Michael M. Rickin

(57) ABSTRACT

This invention is related to suction nozzles having a center protrusion for stabilizing a continuous web for various web property measurements. Suction nozzles blow air out of the nozzle, yet produce a vacuum proximate thereto. Two nozzles are disclosed, a single sided sheet-contact stabilizer and a non-contact sheet stabilizer. An air-bearing may be formed between the end surface of the center protrusion and the moving web.

11 Claims, 6 Drawing Sheets

(56) References Cited

U.S. PATENT DOCUMENTS

| | | | | |
|---|---|---|---|---|
| 4,672,841 A * | 6/1987 | Schuster et al. | ............ | 73/38 |
| 4,791,367 A * | 12/1988 | Typpo | ............ | 324/229 |
| 5,479,720 A * | 1/1996 | Hellstrom et al. | ............ | 33/501.02 |
| 5,742,167 A * | 4/1998 | Haynes | ............ | 324/671 |
| 5,793,486 A * | 8/1998 | Gordon et al. | ............ | 356/328 |
| 6,280,573 B1 * | 8/2001 | Lindsay et al. | ............ | 162/198 |
| 6,743,338 B2 * | 6/2004 | Graeffe et al. | ............ | 162/198 |
| 2005/0157314 A1 * | 7/2005 | Typpoe et al. | ............ | 356/630 |

FOREIGN PATENT DOCUMENTS

| | | |
|---|---|---|
| WO | 99/65682 A1 | 12/1999 |
| WO | 03/035974 A1 | 5/2003 |
| WO | 2007104833 | 9/2007 |

OTHER PUBLICATIONS

Byrne, William, International Searching Authority (CA), International Search Report and Written Opinion of the Canadian Searching Authority for corresponding International Application No. PCT/US2008/002082, Canadian Intellectual Property Office, mailed Jul. 21, 2009.

Nickitas-Etienne, Athina, The International Bureau of WIPO, International Preliminary Report on Patentability for corresponding International Application No. PCT/CA2008/002082, issued on Jun. 2, 2010.

* cited by examiner

SHEET STABILIZER WITH SUCTION NOZZLE HAVING CENTER PROTRUSION

CROSS REFERENCE TO RELATED APPLICATION

This application claims the benefit of U.S. provisional patent application No. 60/990,478 filed on Nov. 27, 2007 and entitled Sheet Stabilizers with Suction Nozzle having Center Protrusion, which is hereby incorporated by reference in its entirety

FIELD OF THE INVENTION

This invention relates to contact and non-contact sheet stabilizers intended for on-line measurement of continuous webs. More specifically, this invention relates to contact and non-contact sheet stabilizers for on-line measurement of a moving web of paper on a paper-making machine.

DESCRIPTION OF THE PRIOR ART

Modern paper-making machines use quality control systems to monitor and control the properties of paper products. Paper properties such as caliper, color, fiber orientation and surface finish etc. are measured using sensors, typically mounted on a scanner, that travel along the cross-machine direction, back and forth over the full width of the paper to be produced. In order to measure the paper properties accurately, many sensors require sheet stabilizers to hold the moving web in a stable and flattened state at a measurement point.

For example, caliper sensors commonly include an optical sensor(s) and a magnetic sensor. Single optical sensor calipers typically require that one of the paper surfaces of the moving web contacts a reference plane at the measurement point. The optical sensor measures the distance between the optical sensor and the paper surface facing the optical sensor. The optical sensor may be calibrated against the reference plane beforehand, so that the thickness of the sheet can be calculated based on the two optic readings with and without the sheet. The magnetic sensor is useful to compensate for variations in the distance between the reference and the optic sensor during scanning or in the case when structural deformation occurs due to temperature change or other disturbances.

In a dual sided optical configuration, the moving sheet does not contact any solid surface, and one optical sensor is positioned on each side of the moving web. A magnetic sensor is also typically used to measure relative distance between the two optical sensors. The optical sensors measure the respective distances between the sheet surface and the corresponding optical sensor. The magnetic sensor measures the distance between the two optical sensors, and the thickness of the moving web is calculated using the three measured distances.

In both of the above disclosed caliper configurations, the sheet stabilizer plays an important role in achieving accurate and repeatable results. In prior art single sided calipers, accuracy required that the sheet maintain contact with the reference plane. In the dual sided configuration, it is important that all measured distances are perpendicular to the sheet surface at the measurement point. Further, it is also important that the two optic devices be aligned coaxially. In the case that the two optic devices are axially offset, the sheet must be perfectly flat around the measurement area to avoid any measurement error induced by the offset. There is therefore a need in the art for improved sheet stabilizers.

SUMMARY OF THE INVENTION

A web stabilizer for stabilizing a moving web, the stabilizer has:
 a nozzle body including a surface facing the web;
 a solid protrusion rotatably mounted in the nozzle body, the protrusion extending outwardly from the nozzle body surface and including a surface facing the web against which the moving web is arranged to be supported by the protrusion surface facing the web to measure a property of the moving web, rotation of the protrusion based on thickness of the web creating an offset between the protrusion surface facing the web and the nozzle body surface whose width depends on the web thickness, the offset determinative of the protrusion surface facing the web supporting the web without any vibration in the web;
 an air chamber positioned within the nozzle body, the air chamber including at least one air inlet port that directs compressed air from a source of compressed air into the air chamber;
 an annular opening located between the protrusion and the nozzle body surface and in fluid communication with the air chamber; and
 wherein the compressed air evacuates the air chamber through the annular opening to form an air bearing between the nozzle body surface and the moving web to suck the moving web towards the protrusion surface facing the web.

DESCRIPTION OF THE PREFERRED EMBODIMENT(S)

Figure 1:
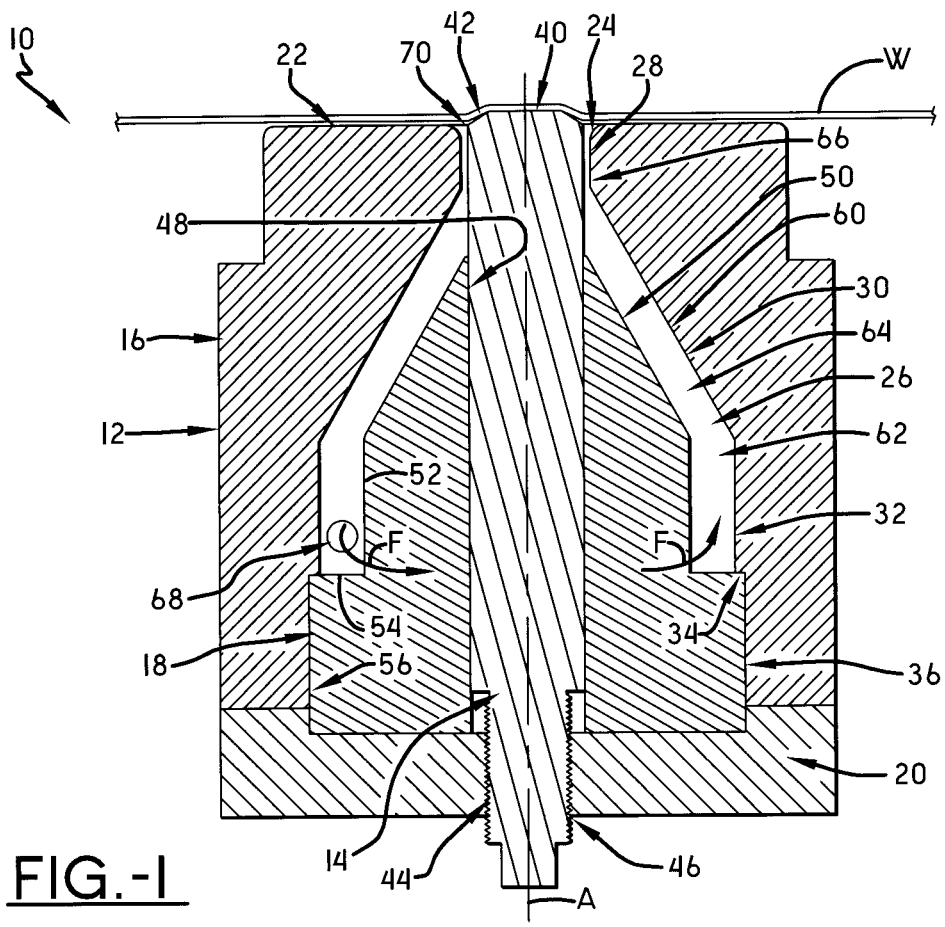
FIG. 1 is a section view of a first embodiment of a single sided contact-type sheet stabilizer of the present invention.

Referring now to FIG. 1, a sheet stabilizer according to the present invention is generally indicated by the numeral 10. Sheet stabilizer 10 includes a suction nozzle 12 including a cylindrical center protrusion part 14, a nozzle body 16, a center piece 18 and a back cover 20. Nozzle body 16 includes a flat top surface 22 with a circular aperture 24 in communication with an internal chamber 26. Nozzle body 16 includes a first cylindrical wall 28 extending downwardly from aperture 24. First cylindrical wall 28 terminates at a downwardly extending frusto-conical wall 30. Frusto-conical wall 30 terminates at a second cylindrical wall 32 having a larger diameter than first cylindrical wall 28. Second cylindrical wall 32 extends from frusto-conical portion 30 to a step surface 34. A third cylindrical wall 36 extends from step surface 34 to the bottom end of nozzle body 16.

Protrusion part 14 includes a circular top surface 40. In one or more embodiments top surface is substantially flat. In these or other embodiments, an annular chamfer 42 extends around the edge of surface 40. In one or more embodiments, top surface 40 is positioned substantially parallel with top surface 22 of the nozzle body 16. Protrusion part 14 extends beyond top surface 22 of nozzle body 16 such that top surface 40 is vertically offset from top surface 22 by a distance D (see FIG. 3). In one or more embodiments, distance D may be from about 0.8 to about 2.0 mm. In these or other embodiments, distance D may be from about 0.8 to about 1.2 mm.

The axial offset distance D is adjustable. To that end, back cover 20 includes a threaded central bore 44 and the bottom end of protrusion part 14 includes a threaded outer surface 46 that engages with the threads of bore 44. By rotating protrusion part 14, the axial offset distance D is adjusted. This adjustability is advantageous when producing paper of varying quality and thickness. For example, variations in paper may require larger or smaller offset distances to achieve optimal performance.

Center piece 18 aligns and supports protrusion part 14 during normal use. Further, center piece 18 guides protrusion part 14 as it moves axially during rotation. To that end, center piece 18 includes a smooth inner cylindrical bore 48 that slidably receives protrusion part 14 therein. The outer surface of center piece 18 includes a frusto-conical portion 50, positioned opposite frusto-conical wall 30 of nozzle body 16. Frusto-conical portion 50 extends downwardly from the top of center piece 18 and terminates at a first cylindrical portion 52. As shown in FIG. 1, first cylindrical portion 52 is positioned opposite second cylindrical wall 32. First cylindrical portion 52 terminates at a step surface 54, from which a second cylindrical portion 56 extends to the bottom of center piece 18. In this manner, it can be seen that second cylindrical portion 56 is captured between step surface 34 and back cover 20 to prevent axial movement. Further, the second cylindrical portion 56 is sized to fit in a snug fashion against third cylindrical wall 36 to prevent radial movement.

As shown in FIG. 1, an air chamber 60 is formed between center piece 18 and the nozzle body 16. Air chamber 60 includes an annular section 62, a frusto-conical or cone-shaped section 64 and a second annular section 66. Annular section 62 is formed between second cylindrical wall 32 and first cylindrical portion 52. Frusto-conical section 64 is formed between frusto-conical wall 30 and frusto-conical portion 50. Finally, second annular section 66 is formed between protrusion part 14 and first cylindrical wall 28.

Nozzle body 16 includes one or more inlet ports 68 which are in communication with air chamber 60 and are connected to a pressurized air source (not shown). Any number of inlet ports 68 may be employed, though a preferred embodiment includes at least two inlet ports 68. Inlet ports 68 are in fluid communication with first cylindrical section 62 and are drilled at constant angular orientation relative thereto. Inlet ports 68 are drilled in a manner such that compressed air entering the air chamber 60 flows in the same circumferential direction. In one or more embodiments, inlet ports 68 are tangential to first cylindrical section 62.

In operation, pressurized air enters the first cylindrical section 62 of air chamber 60 through the inlet ports 68. The air travels in a swirling, circular fashion shown by arrows F. The swirling flow next enters the frusto-conical section 64 and the tangential velocity component of the swirling flow increases due to conservation of the angular momentum. At the second cylindrical section 66, the tangential velocity component is at it's maximum. Because of the swirling motion of the air, the flow inside second cylindrical section 66 is substantially uniform, even though the width of second cylindrical section 66 may not be the same at all circumferential locations due to errors and tolerances associated with mechanical fabrication.

Figure 2:
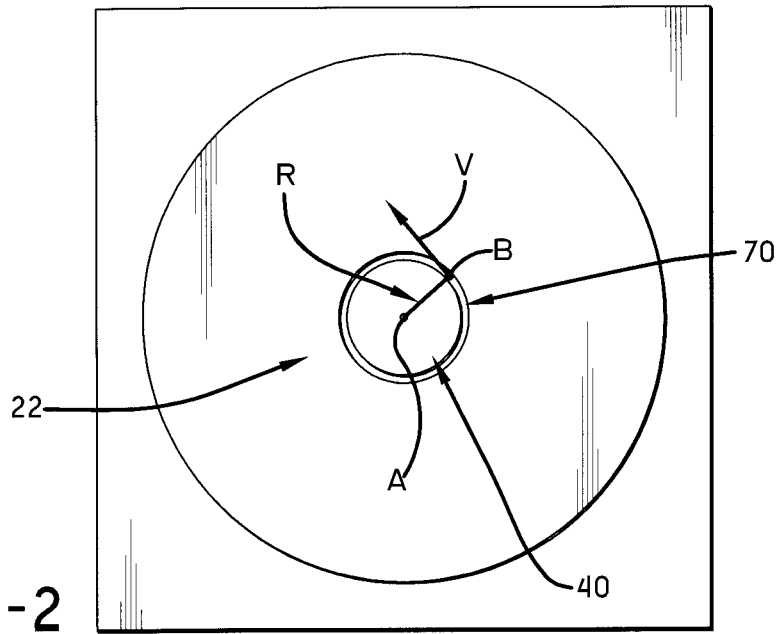
FIG. 2 is a top view of the embodiment of FIG. 1.

Referring now to FIGS. 1 and 2, air exits air chamber 60 at annular opening 70. At any point B, air exiting annular opening 70 has two velocity components: an axial velocity component which is in the direction parallel to the longitudinal axis A of protrusion part 14, and a tangential velocity component V which is parallel with flat surface 22 and normal to the radius R from axis A to the point B at annular opening 70. When the tangential velocity V is greater than the axial velocity at annular opening 70, air flow exiting device 10 will stay close to the surface 22. The larger the tangential velocity component V, the closer the emitted air flow stays to the flat surface 22. Nozzles exhibiting this generally tangential/sideways/radial airflow at the tip are generally referred to as suction nozzles.

The suction nozzle configuration of the present invention creates a vacuum at the area near the center of top surface 40. In other words, if an object is proximate to the center of the annular opening 70, the object is sucked towards top surface 40.

Figure 3:
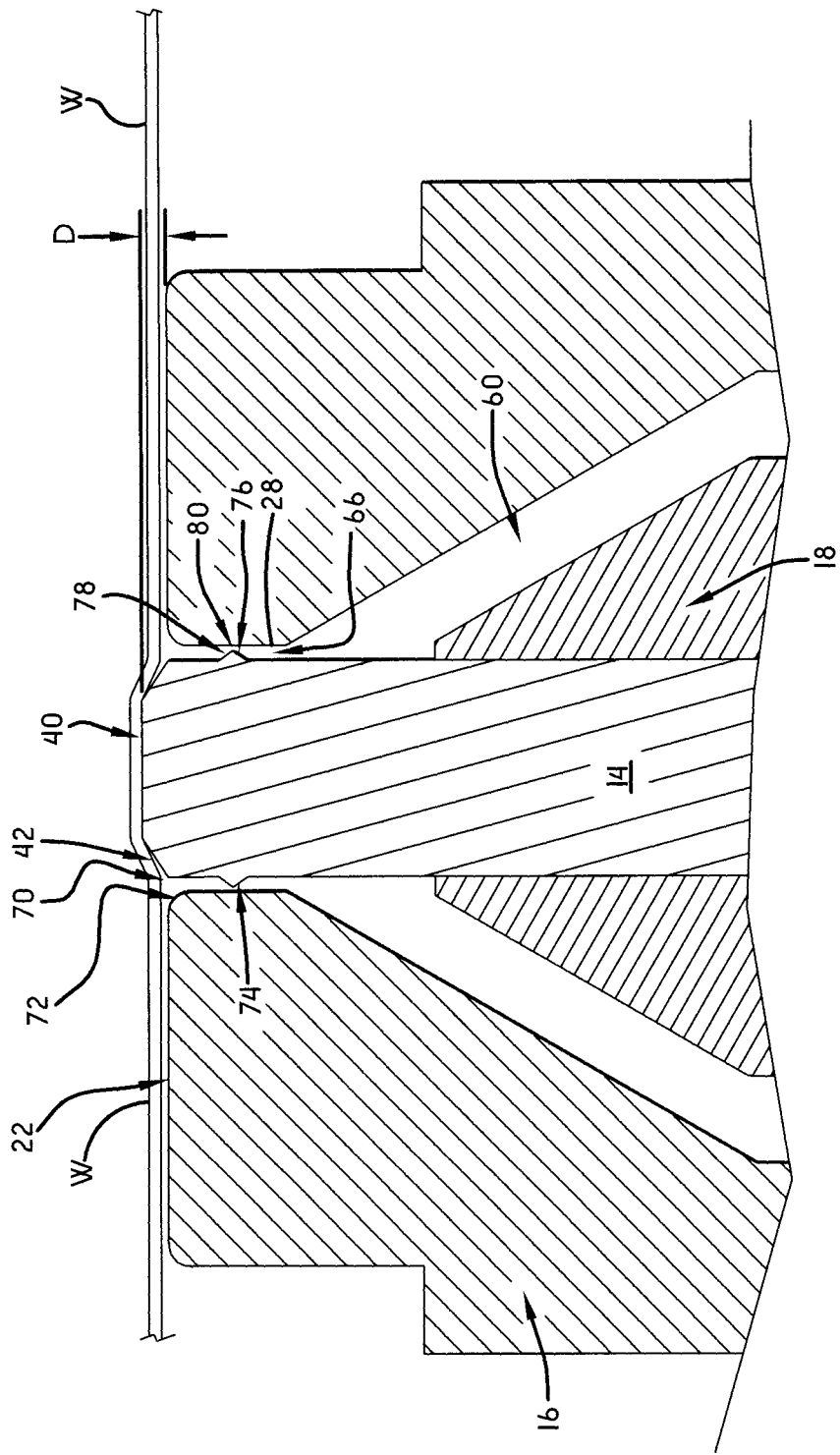
FIG. 3 is an enlarged sectional view of the nozzle exit of the sheet stabilizer of FIG. 1.

Sheet stabilizer 10 can be mounted within close proximity to a moving web W as shown in FIGS. 1 and 3. Sheet stabilizer 10 is shown in FIG. 1 positioned under the moving web W, however, it should be appreciated that sheet stabilizer 10 can be installed above a moving web W without substantially affecting the operation thereof.

When a moving web W is positioned proximate to sheet stabilizer 10, the web W is sucked toward protrusion 14 due to the suction effects of the suction nozzle configuration. The air exiting annular opening 70 in turn forms an air-bearing between the body surface 22 of the nozzle body 16 and the moving web W. Meanwhile, the moving web W contacts top surface 40 of the center protrusion 14 so long as the offset distance D is large enough.

The offset distance D affects the performance of the sheet stabilizer 10 of the present invention. If the offset distance is too small, the moving web W tends to vibrate and generate excess noise. The smaller the offset distance D, the greater the magnitude of the web vibrations. When web W vibrates, it tends to disengage from protrusion 14, thereby alternating between contact and non-contact. Such vibration adversely affects measurement accuracy. However if the offset distance D is greater than about 0.8 mm, the moving web W remains stable and no web vibration is observed. The larger the offset distance D, the more stable the moving web remains.

The moving web proximate to body surface 22 is maintained at a predetermined distance from the body surface 22 due to Bernoulli's principle. If the gap between web W and surface 22 increases, the speed of air passing through the gap increases due to reduced boundary layer friction. As a result, the pressure in the gap reduces and the moving web W is pulled back to the predetermined distance by the out-of-balance pressure force from the outside environment above the web W. If the gap decreases between web W and surface 22, air speed in the gap is reduced because the friction force of the boundary layers increases. As a result, the pressure in the gap increases and the moving web W is pushed back to the predetermined distance by the increased pressure in the gap. Consequently, the portion of web W proximate to annular body surface 22 of the nozzle body 16 is maintained at the predetermined distance.

As discussed above, if no support is provided at the portion of the moving web W positioned over the center of annular opening 70, the moving web W becomes subject to residual wrinkle, potential deformation and web vibration. By creating an offset distance D between the surface 22 and top surface 40, the protrusion part 14 contacts and provides solid support for the moving web W. If the protrusive amount increases further, the middle portion of the web W above top surface 40 is pushed away from the stabilizer 10, which drags the adjoining portion of the web W above the nozzle top surface 22, away from the predetermined position. Consequently the gap between the web W and the body surface 22 increases, and the unbalanced pressure force between the area in the air-bearing gap and the environmental pressure produce a force which tends to pull back the moving web W. Thus, two forces act on the moving web W. The first of the forces is the pushing force from the center protrusion part 14 pushing upwardly on the middle portion of the web W. The other force is the pulling force from the air-bearing due to Bernoulli's effects acting on the portion of web W which is above the surface 22 and surrounds protrusion 14. These two counteracting forces cause the moving web W to stretch flat against the flat top surface 40 of the center protrusion part 14. The chamfer 42 of the protrusion part 14 promotes a smooth transition of the moving web W over protrusion part 14.

Stretching the moving web W against the top surface 40 and the chamfer 42 of the protrusion part 14 removes wrinkles and prevents potential web deformation at the area that contacts the top surface 40 of the protrusion part 14. Stretching the web W also adds tension to the web which prevents vibration. Thus, the area of the moving web W that contacts the top surface 40 is highly stabilized for measurement or other purposes. The area of the moving web W above the body surface 22 is also stabilized through the air-bearing between the moving web W and the nozzle top surface 22.

By adjusting the offset distance D of the center protrusion part 14 and/or the feeding air pressure at inlet ports 68, the contacting force acting on the moving web W through the flat surface 40 of the protrusion part 14 is adjustable. The contacting force is reduced if the offset distance D is reduced or the feeding air pressure is reduced. This feature may be particularly useful for sheet stabilization applications on coated webs. If marks on the coated surface of the web are observed due to the contact from protrusion part 14, the contacting force may be reduced, to eliminate marking on the moving web. The contacting or stabilizing force may be increased by increasing the feeding air pressure or the offset distance D of the center protrusion part 14.

It should be appreciated that the sheet stabilizer 10 of the present invention exhibits good web edge performance. Modern paper machines often require the scanning sensors to measure sheet properties from edge to edge in the cross-machine direction. Consequently the sheet stabilizer 10 may travel on and off the moving web frequently. The suction nozzle configuration and the chamfer 42 of the center protrusion part 14 eliminate the need for operational condition changes when sheet stabilizer 10 moves on and off the moving web W at the web edges.

As shown in FIG. 3, annular opening 70 includes a rounded edge or fillet 72 that produces a Coanda effect, wherein high speed streams of fluid releasing from a narrow slot tend to stay attached to the curvature of a solid surface, rather than follow a straight line in its original direction. Sheet stabilizer 10 functions with or without the aid of Coanda effects, and as such, the rounded edge 72 may be replaced with a sharp edge. However, Coanda effects are useful to further increase the suction force of the sheet stabilizer 10.

Referring now to FIG. 3, an alternative center protrusion part 14 is shown. Stabilizer 10 is substantially the same as the embodiment disclosed above, however, the protrusion part 14 includes an additional feature. Proximate to chamfer 42 an annular protuberance 74 extends outwardly from protrusion part 14 and into second cylindrical section 66 of air chamber 60. Protuberance 74 is shown in cross-section as triangle shaped, with two tapered circular surfaces 76 and 78. It should be appreciated, however, that other shapes may be used. Annular protuberance 74 narrows the second cylindrical section 66 proximate to the annular opening 70. Protuberance 74 is positioned at a recessed level beneath body surface 22 to ensure that it catches or entangles no portion of web W.

The relatively large radius of fillet 72 may be used in combination with protuberance 74 to take advantage of Coanda effects to further increase the suction force of sheet stabilizer 10. When air flow in second cylindrical section 66 enters the narrowed gap 80 the axial velocity components are accelerated. The fast moving air passing through the narrowed gap 80 then attach to the curved surface of the fillet 72 and thereafter follow the body surface 22 due to Coanda effects. By combining both vortex effects (ie. the swirling air pattern) and Coanda effects, the suction force of the sheet stabilizer 10 of the present invention may be substantially increased.

It should be appreciated that sheet stabilizer 10 may work by Coanda effects alone, without using a vortex effect. In such a case, the air inlet ports 68 could be relocated to point directly radially inward toward the axis A of protrusion part 14. In such a configuration, compressed air entering the air chamber 60 would not produce a swirling flow inside the chamber 60. However, such an embodiment includes drawbacks, for example, it is difficult to control the uniformity of the narrow gap 80. If the width of the gap 80 is not the same at all circumferential points, the suction force will not be uniform on the front surface 22.

Figure 4:
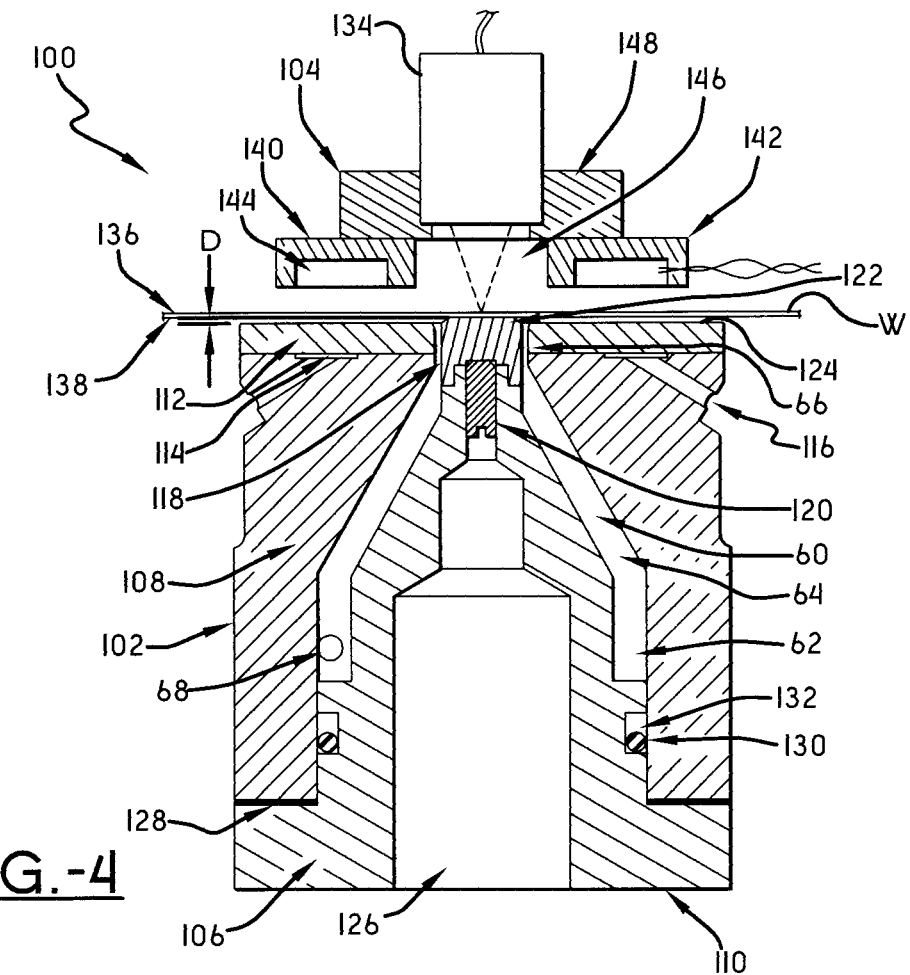
FIG. 4 is a section view of a caliper gauge device including the sheet stabilizer of the present invention.
Figure 5:
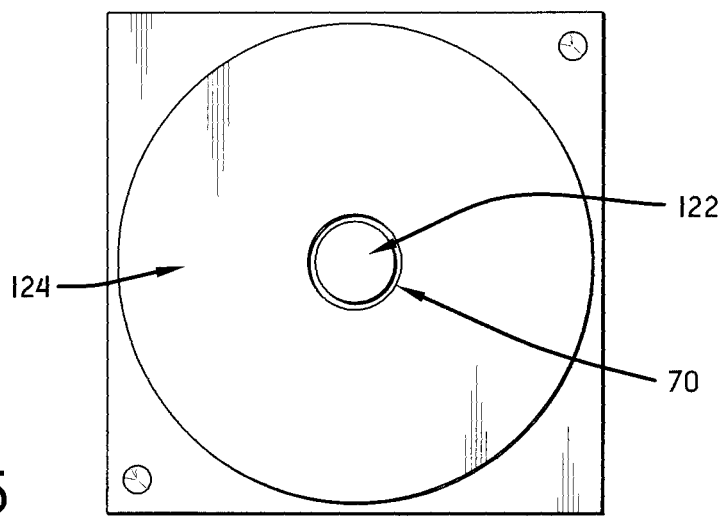
FIG. 5 is a top view of the caliper gauge device of FIG. 4 with the moving web removed.

Referring now to FIGS. 4 and 5, a gauge measurement device, which incorporates the sheet stabilizer of the present invention, is shown and generally indicated by the numeral 100. Device 100 may be installed and used in a web making process line such as a paper making line. When installed, device 100 is positioned in close proximity to a moving web W for measurement purposes. Device 100 includes a first sensor heads 102 and a second sensor head 104 mounted on opposite side of the moving web W. Although first head 102 is shown as positioned under the moving web W and second sensor head 104 is shown above the moving web W, the two heads 102 and 104 can be inversely oriented, with second head on the bottom and first head on top.

Measuring device 100 includes a sheet stabilizer 106 that functions in a substantially similar manner to sheet stabilizer 10, and consequently, same numbers indicate the same elements. The sheet stabilizer 106 includes a nozzle body 108 and a center insert 110. A ferrite target 112 may be secured to the nozzle body 108 by applying glue to a shallow circular recess 114 through a plurality of holes 116 that may be drilled at an angle from the outside cylindrical surface of the nozzle body 108. An optical target 118 is provided that functions in substantially the same manner as protrusion 14. The optical target 118 may be made of hard material such as solid ceramic, sapphire or synthetic diamond and may be attached to center insert 110 by glue. A set screw 120 may be used to ensure that the end surface 122 of the optic target 118 is parallel to a body surface 124 of the ferrite target 112 when gluing the optic target 118 to the center insert 110. A chamber 126 is open at the bottom end of the center insert 110 that allows glue to be injected into the area that bonds optic target 118 and the insert 110 together. The open chamber 126 also allows the installation of set screw 120. One or more shims 128 may be placed between the nozzle body 108 and the insert 110. By changing the width or number of shims 128 the offset distance D of the optic target 118 from the ferrite target 112 is adjustable. An o-ring 130 is mounted in a groove 132 on the center insert 110 to seal the air chamber 60.

The sensor head 104 includes an optical displacement sensor probe 134 that may employ a laser triangular method, a confocal chromatic aberration method or any other optic method which is capable of determining the distance from the probe 134 to the top surface 136 of the moving web W at the measurement area. The measurement area is defined by end surface 122, in the first sensor head 102 at the opposite side of the web. The bottom surface 138 of the moving web W contacts, and is drawn against the flat end surface 122 of the optic target 118 due to the sheet stabilizer 106. Therefore, the end surface 122 functions as a reference plane for the optic displacement measurement.

The sensor head 104 includes a second displacement measurement sensor using a magnetic method. A magnetic displacement sensor using ferrite based inductor systems is shown here for illustrative purposes, though other magnetic sensors may be used. The magnetic sensor includes an inductor 140 having a ferrite cup core 142 and a winding 144. The core 142 is annular and coaxial with the optic sensor 134, defining a center aperture 146 that provides an optical path for the optic displacement measurement. The relative distances between inductor 140 and the optic probe 134 is precisely controlled by a mounting plate 148. Inductor 140 magnetically measures distance to ferrite target plate 112 in first sensor head 102.

Web thickness can be calculated by comparing the magnetic sensor displacement measurement to the optical sensor measurement. The distance from the end surface 122 to the optic sensor can be determined by the magnetic sensor measurement (adjusted by the known offset distance D). The distance from the top surface 136 of the moving web W to the optical sensor 134 is determined by the optic sensor measurement. The difference of the two distances is the web thickness at the measurement point.

Calibration of the magnetic distance measurement versus the optical distance measurement for the gauge device 100 is occasionally performed because the optical sensor typically has a much higher resolution than that of a magnetic sensor. Calibration is generally performed when the web W is not present. A driving mechanism (not shown) may be used to move first sensor head 102 with the optical target 118 and ferrite target plate 112 together to a plurality of different distances from second sensor head 104. The resulting responses from the optical and magnetic signals are recorded and compared, and then the magnetic displacement measurement is calibrated against the optical displacement measurement.

The sheet stabilizer 100/106 is superior to prior art vacuum plates, which suck air into the vacuum plate. Continuous outward air flow from sheet stabilizer 100/106 purges the device and prevents clogging. The air-bearing between the body surface 124 of the ferrite target 112 and the bottom surface 138 of the moving web W protects the ferrite target 112 from abrasion that occurs when using a conventional vacuum plate. Moreover blowing air outwards controls the temperature of sensitive components such as the ferrite target plate 112 and the optic target 118, which consequently reduces measurement error caused by the effects of temperature change. Instead of contacting the whole vacuum plate including both ferrite target and optic target in a conventional vacuum plate, the moving web contacts only the end surface 122 of the optic target 118. This contacting area is typically less than 10 millimeter in diameter, and the contacting force is controllable by adjusting air pressure feeding the inlet ports 68 and/or the offset distance D between surface 122 and surface 124.

Figure 6:
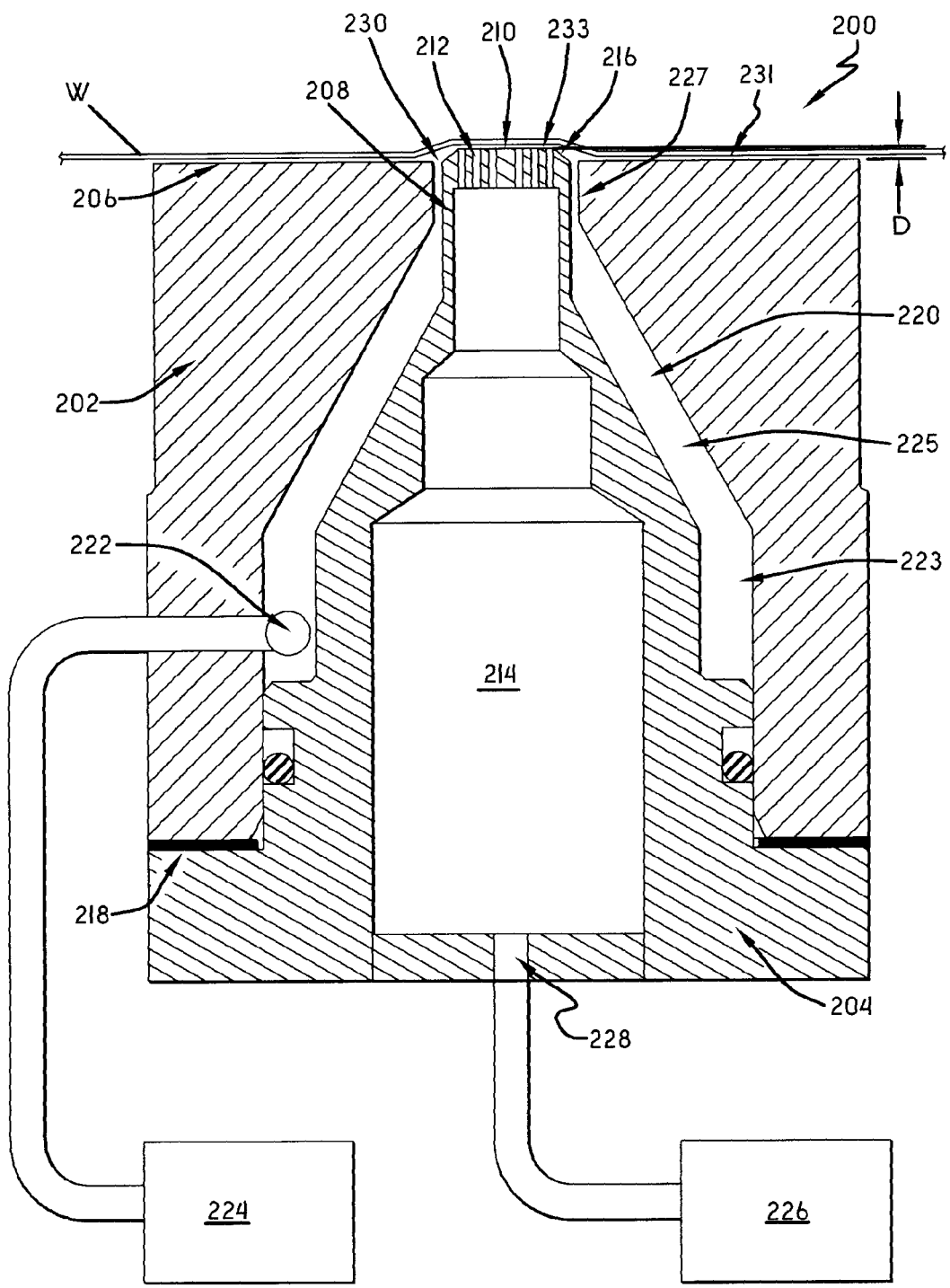
FIG. 6 is a section view of an alternate, non-contact embodiment of the sheet stabilizer of the present invention.

Referring now to FIG. 6, an alternate embodiment of the sheet stabilizer of the present invention is shown and indicated by the numeral 200. The sheet stabilizer 200 is a non-contact stabilizer, ie. no portion of the web W contacts the stabilizer during normal operation. Sheet stabilizer 200 includes a nozzle body 202 and a center insert 204. The nozzle body 202 has a front flat body surface 206, preferably circular in shape. The center insert 204 has a protrusive portion 208 which protrudes beyond the plane defined by the body surface 206. The protrusive portion 208 includes an end flat surface 210 with a plurality of small orifices 212 extending axially inward and communicating with an insert chamber 214. The insert 204 includes a chamfer 216 that extends about the periphery of the body surface 206. A shim 218 is positioned between the nozzle body 202 and the center insert 204. The offset distance D may be changed by using shims 218 of different thicknesses. An air chamber 220 is formed between insert 204 and nozzle body 202 that functions substantially similarly to air chamber 60. Accordingly, a plurality of inlet orifices 222 are drilled in the same angular direction to create swirling/vortex air movement. The inlet orifices 222 are in communication with a first pressurized air source 224. The insert chamber 214 is in communication with a second pressurized air source 226 through a port 228. As noted above, small orifices 212 at the protrusive portion 208 of the center insert 204 are in communication with insert chamber 214.

In operation, the non-contact sheet stabilizer 200 is placed in close proximity of a moving web W. Pressurized air exits the inlet orifices 222 and forms a swirling flow inside air chamber 220 at a first cylindrical section 223, moves upward through a frusto-conical section 225, into a second cylindrical section 227 and exits at the annular opening 230. The sheet stabilizer 200 is configured to function as a suction nozzle so that air coming out of annular opening 230 flows sideways along the body surface 206 instead of traveling axially. As a result, the moving web W is sucked towards the body surface 206 of the nozzle body 202. If the offset distance D is large enough, and no air is fed to the insert chamber 214, the moving web W will contact the flat surface 210 of the protrusive portion 208. Thus, without pressurizing the insert chamber 214, sheet stabilizer 200 functions substantially similarly to sheet stabilizer 10. The moving web W is balanced by a pushing force from the end surface 210 and a pulling force through the air-bearing 231 formed between web W and body surface 206.

As air pressure inside insert chamber 214 increases, the pressure force acting on the bottom surface of the web W increases, which in turn attempts to push the web W away from the flat surface 210 of the protrusive portion 208. If the pushing force from the air pressure inside of the air chamber 214 is larger than the original pushing force from the end surface 210 when there is no positive pressure in insert chamber 214, the web W disengages from end surface 210. A second air-bearing 233 is thereafter formed between the flat surface 210 and the moving web W. Air flow from the center air-bearing 233 will join the air flow exiting annular opening 230 and become part of the air traveling through the outer air-bearing 231 formed between the surface 206 and the moving web W. In this manner, a non-contact sheet stabilizer is provided.

By adjusting the air pressure inside the insert chamber 214, the height of the inner air-bearing 233 is adjustable. The higher the air pressure inside the insert chamber 214, the bigger the height of the inner air-bearing. By setting the air pressure in insert chamber 214 at an appropriate level, an appropriate inner air-bearing height can be achieved. The non-contact sheet stabilizer 200 of the present invention maintains the benefits of the contact sheet stabilizer 10, by stretching the web W around the area close to and above the protrusive surface 210. Meanwhile, the non-contact sheet stabilizer 200 eliminates all the drawbacks associated with physically contacting the moving web W.

The non-contact sheet stabilizer 200 produces two relatively independent air-bearings at the same side of the moving web W. The protrusive inner air-bearing 233 pushes the web away from the sheet stabilizer and the outer air-bearing 231 functions to pull web W back towards the sheet stabilizer 200. Balancing the pushing force with the pulling force, the moving web W is stretched and stabilized at a very close proximity from the sheet stabilizer 200. The moving web W is separated from the sheet stabilizer 200 by the two air-bearings without touching the stabilizer 200. The outer air-bearing can be produced using Bernoulli principle, Coanda effects, vortex effects and a combination of any two or all of the three methods. Instead of using a plurality of orifices for producing the pressurized air cushion as shown in FIG. 6, the inner air-bearing could also be generated using Bernoulli principle, Coanda effects, vortex effects and a combination of any two or all of the three methods in a manner similar to what is employed to generate the outer air-bearing. In this manner, a smaller annular air-bearing is nested inside the outer annular air-bearing. It should further be appreciated that the offset distance D of the present embodiment may be smaller than that of the contacting stabilizer 10. This is due to the fact that the compressed air exiting insert chamber 214 effectively extends the effective protrusive distance.

Figure 7:
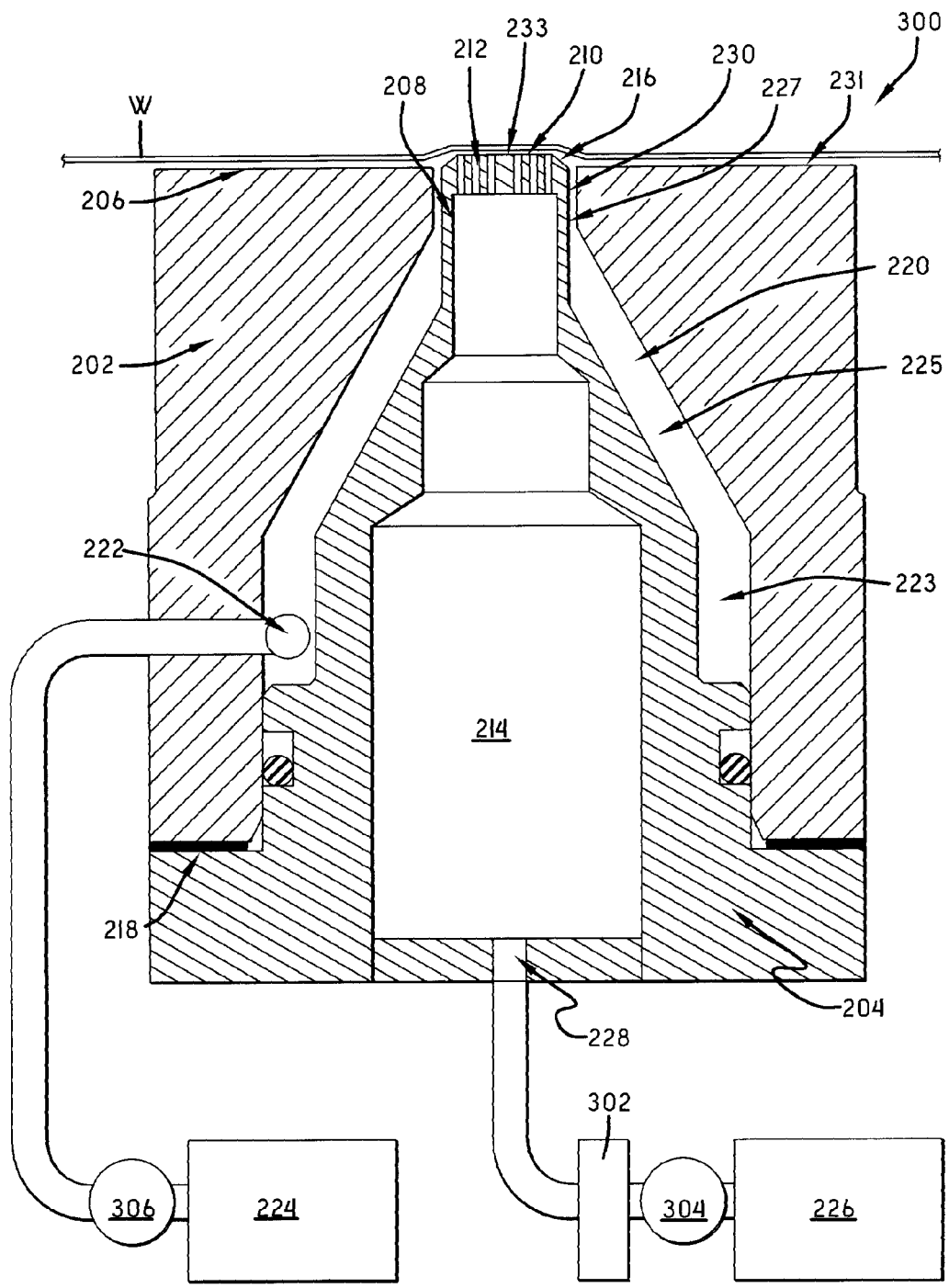
FIG. 7 is a section view of the lower portion of an alternate embodiment of a caliper gauge including the sheet stabilizer of the present invention.

Referring now to FIG. 7, a caliper measurement device 300 is shown that employs the non-contact sheet stabilizer 200. Device 300 may include pressure regulators 304 and 306 that are installed downstream of the compressed air sources 224 and 226 respectively. Pressure regulator 306 controls and maintains the air pressure in air chamber 220, which in turn controls and maintains the air pressure near the exit of the annular opening 230 or the exit of the plurality of orifices 212. Pressure regulator 304 controls and maintains the air pressure in insert chamber 214. Therefore the pressure drop through the plurality of orifices 212 is fixed by using the two pressure regulators 304 and 306. A flow-meter 302 is mounted between the pressure regulator 304 and air inlet 228 at the entrance of the air chamber 214. Flow-meter 302 measures the rate of air passing through the plurality of orifice 212 which is the same as the flow rate passing through a circular gap formed between the bottom surface of the moving web W and the circular edge around the flat surface 210. The height of the circular gap can be considered as an averaged height of the inner air-bearing 233. Flow-rate is functionally related to pressure drop through the plurality of orifices 212 and the inner air-bearing height. The reading of the flow-meter 302 may be converted to a height measurement between web W and end flat surface 210 since the pressure drop through the plurality of the orifices 212 is predetermined by the two pressure regulators 304 and 306. In this manner, by adding an optic sensor above the moving web and a magnetic sensor (as shown in FIG. 4) a non-contact caliper sensor can be achieved.

Figure 8:
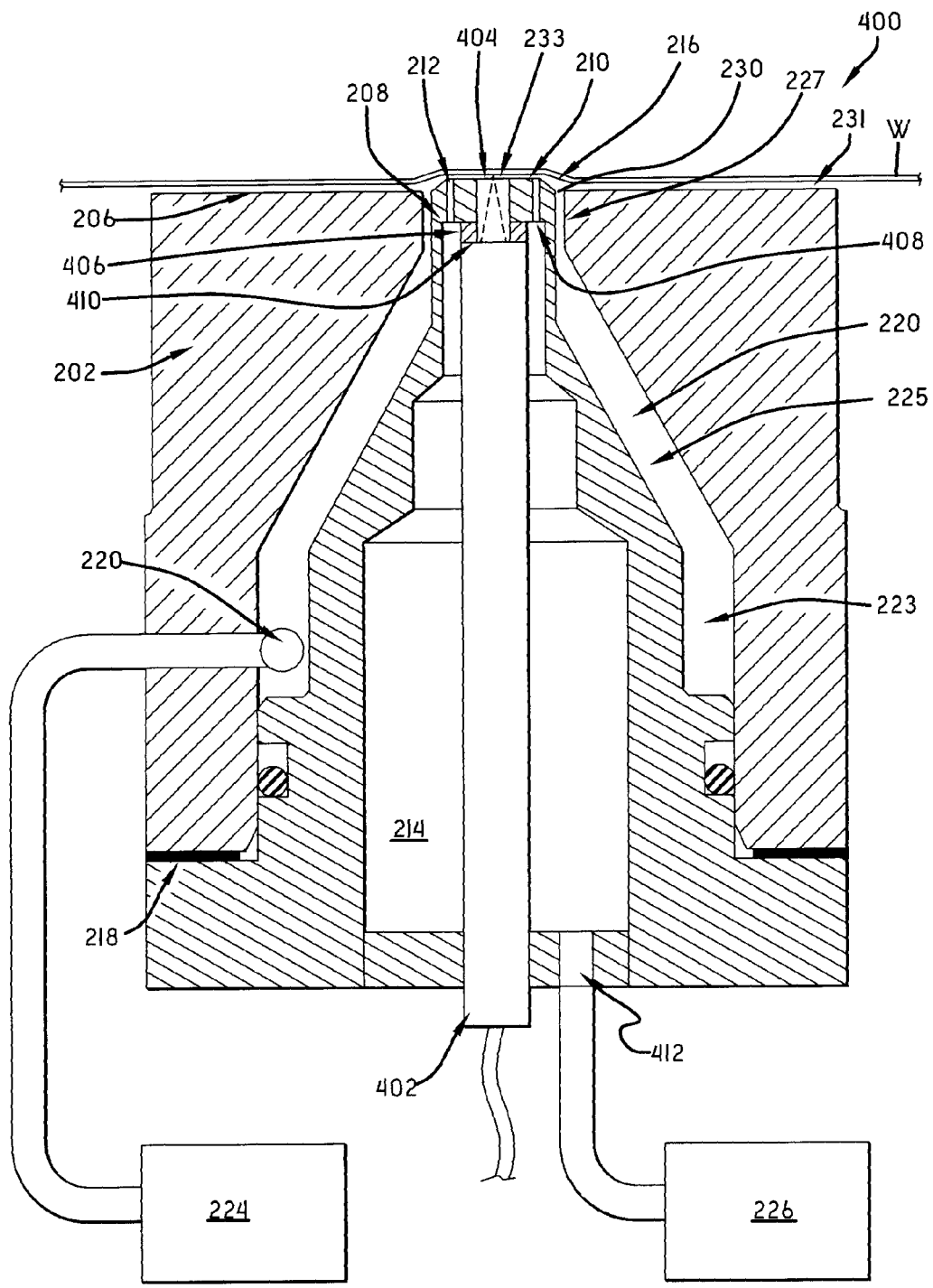
FIG. 8 is a section view of the lower portion of a second alternate embodiment of a caliper gauge including the sheet stabilizer of the present invention.

The air-bearing height of the inner air-bearing can also be measured more precisely using an optic probe embedded inside the sheet stabilizer of the present invention. Referring now to FIG. 8, a caliper measurement device 400 includes an optic sensor to measure the inner air-bearing height. Device 400 includes stabilizer 200 which also includes an optic probe 402 which may be smaller but functionally equivalent to optic sensor 134 (shown in FIG. 4) and is mounted inside the insert chamber 214. A center aperture 404 is provided through the end surface 210 of the protrusive portion 208 to provide an optic path for the optic distance measurement. A plurality of orifices 212, in communication with the insert chamber 214 are located in a spaced arrangement around center aperture 404. A ring 406 may be contained between a flat surface 408 located at the far end of the insert chamber 214 and an end surface 410 of the optic probe 402, so that the distance from the optic sensor 402 to the reference surface or the end flat surface 210 is controlled precisely. Optionally, notches may be provided in ring 406 to allow pressurized air from insert chamber 214 to pass through the ring and purge the center aperture 404. The air inlet 412 may be relocated away from the center axis to make way for the installation of the optic probe 402. The optic probe 402 can measure the air-bearing height or the distance between the bottom surface of the moving web W and the reference surface 210.

In this manner, by adding an optic sensor above the moving web and a magnetic sensor to measure the relative distance between first and second opposed sensor heads (as shown in FIG. 4), a non-contact caliper sensor can be achieved. The optic probe 402 positioned under the web W and inside the sheet stabilizer 200 of the present invention requires a smaller measurement range than that of the optic probe 134 mounted above the web W. Since the height of the center air-bearing 233 is typically less than 0.2 millimeter, a measurement range of 0.3 mm or larger for optic probe 402 provides an adequate range. Considering the z-direction fluctuation of the sensor head packages of a typical scanning frame and the variety of paper grades with different thickness to be measured, the measurement range of the optic probe 134 positioned above the sheet should preferably be at least a 2-4 millimeters.

As those of ordinary skill in the art can appreciate, the sheet stabilizers of the present invention can have other applications where the need exists for a web stabilizing device with or without contacting the web. The sheet stabilizers of the present invention can also be used for measurement applications other than caliper measurement as disclosed in this application.

It is to be understood that the description of the embodiment(s) in this application is (are) intended to be only illustrative, rather than restrictive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A web stabilizer for stabilizing a moving web, the stabilizer comprising:
    a nozzle body including a surface facing said web;
    a solid protrusion rotatably mounted in said nozzle body, said protrusion extending outwardly from said nozzle body surface and including a surface facing said web against which said moving web is arranged to be supported by said protrusion surface facing said web to measure a property of said moving web, rotation of said protrusion based on thickness of said web creating an offset between said protrusion surface facing said web and said nozzle body surface whose width depends on said web thickness, said offset determinative of said protrusion surface facing said web supporting said web without any vibration in said web;

an air chamber positioned within said nozzle body, said air chamber including at least one air inlet port that directs compressed air from a source of compressed air into said air chamber;

an annular opening located between said protrusion and said nozzle body surface and in fluid communication with said air chamber; and wherein said compressed air evacuates said air chamber through said annular opening to form an air bearing between said nozzle body surface and said moving web to suck said moving web towards said protrusion surface facing said web.

2. The web stabilizer according to claim 1 wherein said at least one air inlet port is configured to cause a vortex flow pattern within said air chamber.

3. The web stabilizer according to claim 2 wherein said air chamber includes a first cylindrical section, a second cylindrical section and a frusto-conical section, said second cylindrical section having a smaller diameter than said first cylindrical section.

4. The web stabilizer according to claim 3 wherein said at least one air inlet port is positioned at said first cylindrical section, said frusto-conical section joining said first cylindrical section and said second cylindrical section, and said second cylindrical section being proximate to said annular opening.

5. The web stabilizer according to claim 3 wherein a protuberance is within said second cylindrical section, said protuberance locally narrowing said second cylindrical section at a location proximate to said annular opening.

6. The web stabilizer according to claim 1 wherein said nozzle body surface is substantially parallel to said protrusion surface facing said web.

7. The web stabilizer according to claim 1 wherein said protrusion includes a chamfer extending circumferentially around said protrusion surface facing said web.

8. The web stabilizer according to claim 1 wherein the offset width between said nozzle body surface and said protrusion surface facing said web has a range is from 0.8 to 2.0 mm.

9. The web stabilizer according to claim 1 wherein the offset width between said nozzle body surface and said protrusion surface facing said web is 1.0 mm.

10. The web stabilizer according to claim 1 wherein said protrusion surface facing said moving web includes no apertures.

11. The web stabilizer of claim 1 wherein said protrusion is threadedly mounted in said nozzle body.

* * * * *